June 7, 1932.  J. S. STOKES  1,862,205
COMPOSITE BOX
Filed March 10, 1930  2 Sheets-Sheet 1
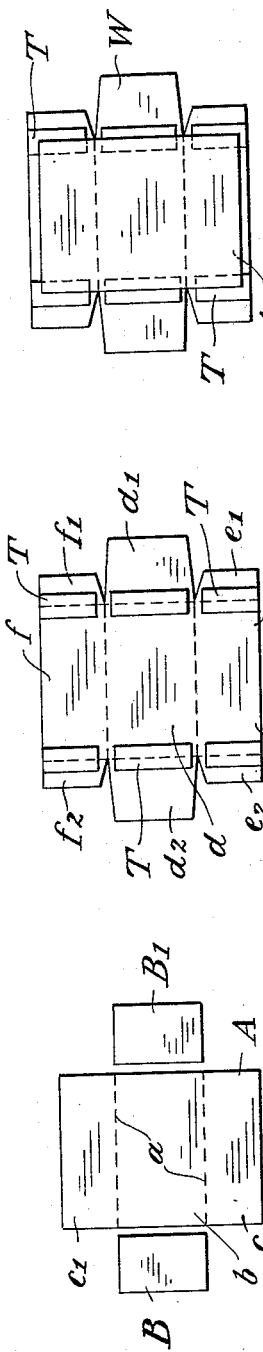
INVENTOR
John S. Stokes
BY
Cornelius L. Ehret
ATTORNEY.

June 7, 1932. J. S. STOKES 1,862,205
COMPOSITE BOX
Filed March 10, 1930   2 Sheets-Sheet 2
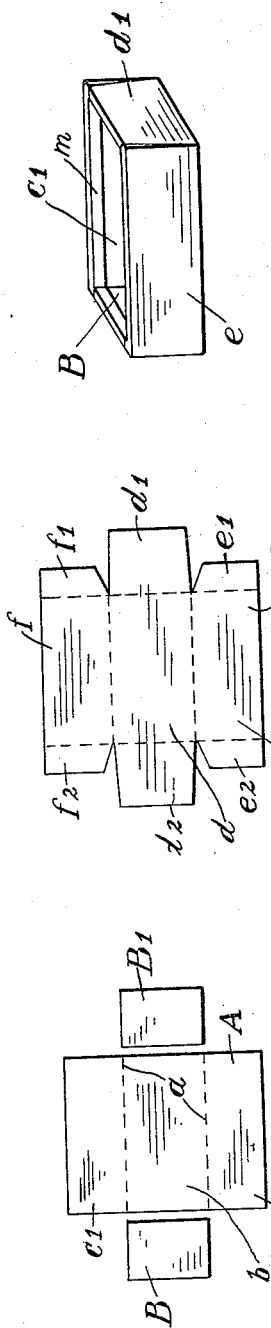
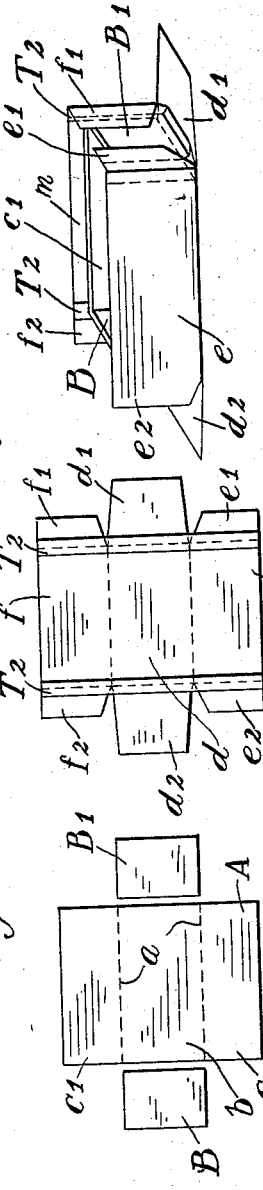
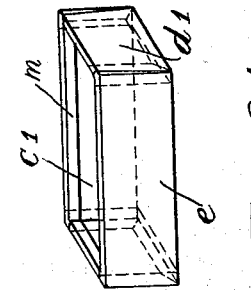
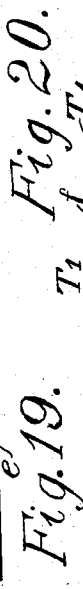
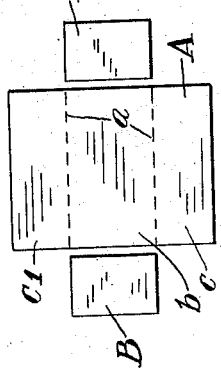
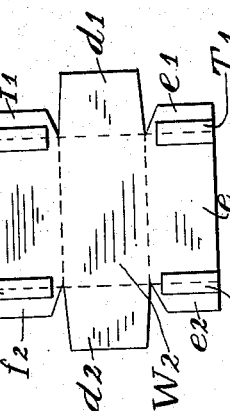
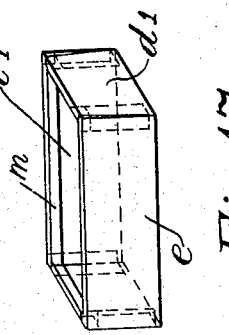
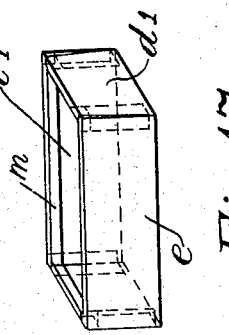
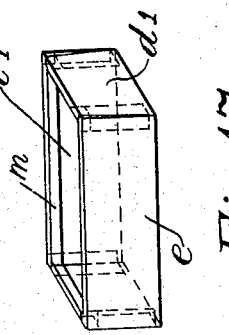
INVENTOR
John S. Stokes
BY Cornelius D. Ehret
ATTORNEY.

Patented June 7, 1932

1,862,205

UNITED STATES PATENT OFFICE

JOHN S. STOKES, OF HUNTINGDON VALLEY, PENNSYLVANIA

COMPOSITE BOX

Application filed March 10, 1930. Serial No. 434,654.

My invention comprehends the utilization of an individual wrapper, sheet, label, or equivalent, hereinafter generically termed a "wrapper," and particularly a tabbed or reinforced wrapper, for holding a plurality of individual components, sections or elements of suitable material in the form of a box, carton, container structure, or equivalent, hereinafter generically termed a "box."

In accordance with my invention, a box is formed or constructed by assembling in suitable relation a plurality of separate individual box-forming components and retaining such components in box-forming position by adhesively applied sheet material, specifically a previously prepared individual wrapper.

My invention resides in a box per se formed of a plurality of box-forming components maintained in box-forming position by a coated wrapper and more particularly in a box wherein the coated wrapper comprises one or more tabs overlying one or more corners formed by distinct and separate box-forming components, specifically a component forming the box bottom and at least one vertical wall and other separate components forming other vertical walls.

My invention resides in a box of the construction and having the features hereinafter described and claimed.

This application is a continuation in part of my copending application Serial #88,231, filed Feb. 15, 1926.

For illustration of various forms of the box and their mode of assembly or construction, reference is to be had to the accompanying drawings in which:

Fig. 1 is a plan view illustrative of box-forming components utilizable for forming a box.

Fig. 2 is a plan view of a coated tabbed wrapper.

Fig. 3 is a plan view of a coated tabbed wrapper with a box-forming component adhering thereto.

Fig. 4 is an elevational view of the upper form block of a wrapping machine, showing box-forming components carried at opposite ends thereof.

Fig. 5 is a perspective view of a tabbed wrapper in registering relation with a box-forming component, the form block structure of a wrapping machine being indicated in dotted lines.

Fig. 6 is a perspective view generally the same as Fig. 5, but showing another position of the form block structure after the wrapper and box-forming component have been engaged one with the other.

Figs. 7 to 11 inclusive, represent, respectively, in perspective the successive stages of a box-forming and box-wrapping operation.

Fig. 12 is a plan view of box-forming components utilizable for forming a box.

Fig. 13 is a plan view of an untabbed wrapper.

Fig. 14 is a perspective view of a box produced by wrapping the components of Fig. 12 with the blank of Fig. 13.

Fig. 15 is a plan view of box-forming components utilizable for forming a box.

Fig. 16 is a plan view of a modified form of tabbed wrapper.

Fig. 17 is a perspecive view of a box produced by wrapping the box components of Fig. 15 with the wrapper blank of Fig. 16.

Fig. 18 is a plan view of box-forming components utilizable for forming a box.

Fig. 19 is a plan view of another modified form of tabbed wrapper.

Fig. 20 in perspective illustrates an intermediate step in the application of the blank of Fig. 19 to the components of Fig. 18.

Fig. 21 is a perspective view of the completed box formed from components of Fig. 18 and wrapper of Fig. 19.

Heretofore, boxes have been constructed from one-piece blanks having cut-out corners. The excess material thus excluded cannot ordinarily be salvaged and, therefore, is an item of expense in the production of boxes ordinarily yielding no return.

In accordance with my invention, the old method of forming a blank from a one-piece blank is discarded and, as a substitute, a plurality of separate and distinct box-forming components are associated with adhesively coated sheet material as an individual adhesive-coated wrapper, in such manner that the wrapper maintains such components in box-forming position. As a result, in practicing my invention, I effect a decided saving in material as well as labor, particularly the cost of the box blank corner-cutting operation.

An individual coated wrapper of any suitable shape or configuration may be utilized for securing the various box-forming components in the desired box-forming position. The wrapper may be either tabbed or untabbed. If tabbed, the wrapper may be of the general character illustrated in my prior Letters Patent No. 845,205, involving the gluing of reinforcing strips or tabs to an uncoated wrapper, by any suitable mechanism, such, for example, as that of the character disclosed in prior Letters Patent to Reifsnyder et al. No. 1,060,026 or to Nitsch et al. No. 1,451,782. With a wrapper of this character, the adhesive holding the tabs to the wrapper is allowed to dry or set, and the tabbed wrappers are stored, as in stacks, until later used in the wrapping operation when each tabbed blank and the exposed faces of the tabs are coated with adhesive, as in an automatic gluing or adhesive-applying machine, and thereupon applied to the box-forming components, as in a wrapping machine of the character disclosed in Letters Patent to Smith No. 691,329 or 778,805 or to Federwitz et al. 1,541,036. Or, and preferably, the both operations of applying reinforcing elements or tabs to the wrapper, and of coating the box-engaging faces of the wrapper and tabs with adhesive, are performed just prior to the application thereof of the box-forming components and before drying or setting of the adhesive coatings as disclosed in my U. S. Patent No. 1,599,500, granted September 14, 1926.

Referring to Fig. 1, there are illustrated three box-forming components, sections or elements of suitable shape or configuration and of suitable material, as box-board, paper, paste-board, cardboard, or other material, destined to form a generally rectangular box after proper manipulation and assembly. As shown, there is provided a main box-forming component A, preferably scored or creased as indicated by the two parallel lines $a$, the scored portions constituting opposite boundaries of a generally rectangular section $b$ forming, upon completion of the box, one face thereof, as the bottom. Lying respectively outwardly of the scored portions of box-forming component A, aforesaid, are the substantially duplicate sections $c$ and $c1$ forming, upon completion of the box, opposite faces thereof, as the two sides.

The substantially duplicate box-forming components, sections or elements B and B1 shown in Fig. 1 as lying at each end of box-forming component A, during the forming and wrapping operation hereinafter described, are associated with and connected or secured to said component A in angular relation with their edges in registering relation for forming, upon completion of the box, opposite faces thereof, as the two ends.

In Fig. 2, I have illustrated an individual corner-cut wrapper W, consisting of a single sheet of paper or equivalent material, of suitable configuration, for example, as disclosed in a prior patent to myself and another, No. 1,265,273, May 7, 1918, or as shown in my co-pending application Serial No. 89,127, filed February 18, 1926, consisting of a composite wrapper comprising a plurality of component elements secured to each other. As herein shown, wrapper W comprises a bottom section $d$ and the front and rear wall sections $e$ and $f$. The front wall section $e$ comprises the corner lap section $e1$ and $e2$, while the rear wall section $f$ comprises the corner lap sections $f1$ and $f2$. Bottom section $d$ comprises the end wall sections $d1$ and $d2$.

Wrapper W is first coated on one face thereof in selected regions or over the entire facial area with glue or equivalent adhesive, the application of the adhesive being made while the wrapper is in a stack thereof or, and preferably, after removal from the stack.

Thereafter, one or more tabs T, of any suitable material as paper of any suitable form and size, is or are applied to that portion of the coated wrapper destined to come into engagement with the edges, corners or other portions of the box for reinforcing or strengthening the completed box, as hereinafter described. In the example illustrated, both sides of the tabs T, when applied to wrapper W, are free of adhesive, the adhesive coating upon said wrapper serving to secure the tabs. It will be understood, however, that the wrapper-engaging faces of the tabs T may be coated with adhesive before application to the coated wrapper W, though it is preferred, and will ordinarily suffice, that the wrapper-engaging faces of the tabs be uncoated when applied to the coated wrapper.

Tabs T may be severed, as needed, from a suitable ribbon or roll, or may be first formed and piled in stacks and withdrawn as and when required, all as disclosed in my said U. S. Patent No. 1,599,500.

After the tabs have been so applied to the previously coated wrapper W, the box-engaging surfaces of the tabs are coated with adhesive, yielding, as indicated in Fig. 2, a coated wrapper W with adhering coated tabs T.

The tabbed wrapper has now been prepared for application to the box-forming components illustrated in Fig. 1, and such application is preferably made promptly, while the coated wrapper W and its coated tabs T are soft and pliable, and before the adhesive coatings upon the wrapper and tabs have dried, hardened or set.

Initially, engagement may be effected between box-forming component A and the individual wrapper W in such manner that bottom section $b$ and side sections $c$ and $c1$ of said component A, respectively, engage and adhere to bottom section $d$ and front and rear wall sections $e$ and $f$ of said wrapper W. As indicated in Fig. 3, the length of box-forming component A, or the distance along a line $a$ thereof, is such that the component extends from the apexes of the notches on one side of the wrapper to the apexes of the notches on the other side thereof. Further, the width of component A, or the distance along a line at right angles to the lines $a$, thereof, is such that free portions of the front and rear wall sections $e$ and $f$ of wrapper W are exposed, Fig. 3. Such exposed sections are tucked around the front and rear sides of the box, as hereinafter described.

When wrapper W is reinforced with tabs T as indicated in Fig. 2 and box-forming component A is engaged therewith in the manner illustrated in Fig. 3, it will be found that the opposite edges of said component at right angles to the lines $a$, thereof, divide tabs T into substantially equal portions, those nearest the center of the wrapper lying between component A and the wrapper while the other portions lie exteriorly of component A and are not engaged thereby.

At the next stage in the operation, a form block or equivalent structure may be so placed as to overlie section $b$ of the component A comprised in the composite structure indicated in Fig. 3. The base of this form block corresponds in size with section $b$, and is of a height corresponding generally with the distance across either section $c$ or section $c1$ of box-forming component A, along a line drawn at right angles to the lines $a$, thereof.

Assuming that the structure shown in Fig. 3 is in a horizontal position with box-forming component A, overlying wrapper W, sections $e$, and $f$, of said component, the portions of wrapper W adhering thereto and the outwardly positioned tabs T are bent upwardly into vertical positions, the scored or creased construction of element A readily permitting this action.

At the next stage in the assembling operation, box-forming components B and B1 are located in vertical positions and suitably held at each end of, and in engagement with, the form block, Fig. 7.

Thereafter, the now vertical corner lap sections $e1$ and $f1$ of wrapper W are folded inwardly into engagement with box-forming component B1 while corner lap sections $e2$ and $f2$ of said wrapper are likewise folded into engagement with box-forming component B, Fig. 8.

End wall section $d1$ of wrapper W is now folded upwardly into engagement with box-forming component B1 and the adhering corner lap sections already folded into engagement therewith. Similarly, end wall section $d2$ of said wrapper is folded upwardly into engagement with box-forming component B and its adhering corner lap sections, Fig. 9.

Finally, the portions of the wrapper protruding above the upper edges of the now vertical box-forming walls are folded downwardly and into adhering engagement with the interior surfaces of said vertical walls to form the completed box illustrated in Fig. 11.

It will be observed that the various reinforcing tabs T respectively overlie the various dihedral corners of the box and adhere to all the box faces meeting in any corner. As a result, the box corners are reinforced and the set-in box-forming components, ends or elements B and B1 are firmly and securely bound to the main box-forming component, section or element A.

All the foregoing operations may be performed manually. Preferably, however, they will be performed by automatic mechanism. For example, the individual wrappers W, when in a stack, may be operated upon in an automatic adhesive-applying machine, such, for example, as disclosed in Nitsch et al. application Serial No. 69,249, or in the adhesive-applying unit G of Federwitz and Bailey application Serial No. 40,769. The individual coated wrappers, as W, may then be tabbed by any suitable mechanism, including such, for example, as of the character disclosed in the aforesaid Letters Patent No. 1,060,026, or 1,451,782, or, and preferably, during pauses in their travel from the gluing machine G to the wrapping machine W, in a system such as disclosed in the aforesaid Federwitz et al. application Serial No. 40,769, as by suitable mechanism associated with the conveyor or feeding unit C of that system. Accordingly, individual tabbed wrappers W are fed in succession in proper relation between the form block structure of a wrapping machine as shown in broken lines in Fig. 5 and comprising the upper and lower form blocks F and F1 operated as well understood in suitable timed relation by the usual rods $f4$ and $f5$. The wrapping machine aforesaid may be of any suitable character as, for example, of the same general type disclosed in the aforesaid Smith Patents 691,329 and 778,805, or the aforesaid Federwitz et al. Patent 1,541,036; or, and preferably, in a wrapping machine W of the aforesaid Federwitz et al. application, Serial No. 40,769, to which the tabbed wrappers are fed in succession by the conveyor unit C.

The usual guide rods $g4$ comprised in the wrapping machine support rods or members $m4$ extending laterally from said guide rods. Carried respectively by members $m4$ are the holding fingers or clips c4. As well understood in the art, guide rods g4 move relative to rod f4 whereby, when form block F is in its upper region of travel, holding fingers c4 are positioned entirely thereabove. However, as the form block pursues its downward course, the ends of the holding fingers move downwardly into the position illustrated in Fig. 4.

Preferably box-forming components B and B1 are piled in previously prepared horizontally-disposed stacks S and S1, Fig. 4, suitably arranged at the same ends of the form block structure as are the holding fingers c4. While form block F is in its upper region of travel aforesaid, individual box-forming components are suitably removed from the stacks S and S1 and transferred into engagement with the ends of the form block. Immediately thereafter, holding fingers c4 move into the position indicated in Fig. 4, whereby said components are positively retained in engagement with the ends of form block F.

Box-forming components A may be individually fed or transferred in succession between the upper and lower form blocks of the wrapping machine in any suitable manner, preferably, however, in a system such as disclosed in the aforesaid Federwitz et al. application, Serial No. 40,769, as by the box-advancing structure or rods therein disclosed for delivering individual box-structures beneath the upper form block.

Accordingly, in the wrapping machines, an individual tabbed wrapper W and a box-forming component A come into proper register with each other in proper relation to the descending form block F to which the box-forming components B and B1 are secured during its descending movement, Fig. 5.

In Fig. 6, a stage of the operation is illustrated wherein the upper form block F has effected engagement of wrapper W and box-forming component A and the composite structure has been moved into engagement with the lower form block F1.

Figs. 7 to 11 inclusive, illustrate succeeding stages in the box-assembling and wrapping operation, Fig. 11, showing the finished article, a wrapped box B2. By the operations described, either manual or as performed by the automatic mechanism of the wrapping machine, the wrapper flaps are applied to the box-forming components in suitable sequence, the tabs T being at a suitable times applied to and worked around the box corners.

Although the foregoing description is limited to the formation of a box from a specified number of box-forming components, sections or elements, it shall be understood that my invention comprehends the utilization of a greater or smaller number of such components. Further, it shall be understood that my invention also comprehends the manipulation and assembly of a desired number of box-forming components in other ways specifically different from the corresponding disclosure of this application.

It shall also be understood that my invention is not to be restricted to the utilization of a wrapper that is tabbed, strengthened or otherwise reinforced, since at times and under certain conditions, it may be desirable to utilize a plain wrapper wherein all strengthening or reinforcing structure or tabs is omitted. Plain wrappers of such character may be fed in succession to a wrapping machine, as aforesaid, in any desired manner, for example, as described above with respect to the delivery of tabbed or reinforced wrappers. The separate box elements or components B, B1, and A of Fig. 12 by application of the plain or untabbed wrapper of Fig. 13 are held in position to form a box, Fig. 14. The steps of the box-forming and wrapping operation may be identical with or substantially similar to those illustrated in Figs. 3 to 11 and as described in connection with those figures.

Likewise it shall be understood that types of individual wrappers may be utilized differing from wrapper W and W1, and that in the region or regions wherein the reinforcing tab or tabs is or are applied may be varied as desired to effect proper reinforcing or strengthening in the desired regions of the completed box structure. For example, the wrapper W2 shown in Fig. 16 corresponding in appearance with the disclosure of my aforesaid Patent 845,205 may be applied to the separate box elements A, B, and B1, Fig. 15, to hold them in box-forming position (Fig. 17) with the tabs T1 reinforcing the vertical edges or corners of the completed box and uniting end elements B, B1 to the side panels of the box component A.

In the wrapper W3, Fig. 19, the tabs T2 extend across the wrapper in order that, as in the previously described modification, Figs. 1 to 11, the bottom end edges of the box formed by end elements B, B1 and the central section or bottom panel of element A, Fig. 18, may be reinforced. Additionally as the tabs extend across or bridge the corner notches of the wrapper, as described and claimed in my co-pending application Serial #79,936 filed January 8, 1926, the trihedral corners of the box are reinforced by the tabbing structure.

In all modifications, the outer ends of the tabs preferably terminate at or adjacent the outer edge of the wrapper side panels, whose width is greater than the height of the box by the marginal turn-ins m. Accordingly during the wrapping operation, Figs. 10 and 11, the tabs are bent over the top edges of the box and downwardly into engagement with the inside further strengthening the union between the separate elements A, B and B1 effected by the wrapper.

It shall also be understood that the tabbed wrapper may be applied to the box-forming components after the adhesive securing the tabs to the wrapper has hardened or set although, as indicated above, it is desirable that application of the wrapper to the box-forming components be effected before the adhesive coating on the wrapper has materially hardened or set.

When utilizing a composite wrapper, for example, as illustrated and described in my aforesaid co-pending application, Serial No. 89,127 filed February 18, 1926, it is preferable that the application of the wrapper to the box-forming components be effected prior to material hardening or setting of the adhesive with which the wrapper components are coated.

In the wrapping operation heat may be applied, as disclosed in my co-pending application Serial No. 71,178, filed November 24, 1925, to set or to hasten setting or drying of the adhesive which holds the tabs, when used, to the wrapper and of the adhesive on the box-engaging faces of the wrapper and tabs, when used.

The preferred operation is as described, namely, that of utilizing the individual wrapper, and the tabs, when used, as the sole reinforcing or retaining structure for the box-forming components. It shall be understood, however, that the box-forming components may be first assembled and maintained in box-forming position by suitable structure, as by webs overlying the various corners, and that thereafter the individual wrapper, or the wrapper and the adhering tabs, may be applied in any suitable manner, as described and claimed in my co-pending application Serial #147,405, filed November 10, 1926.

Inasmuch as a box top is substantially similar to that part of the entire box commonly utilized as the receptacle, it shall be understood, in the appended claims, that the expression "box bottom" is descriptive either of the top of the box top or the bottom of the receptacle.

What I claim is:

1. A box comprising a component forming the box bottom, separate components forming vertical walls, and a wrapper comprising the sole means for uniting said components in box-forming position having panels joining said box bottom to said separate components.

2. A box comprising a component forming the box bottom, separate components forming a pair of vertical walls, and a wrapper comprising the sole means for uniting said components in box-forming position having panels joining said box bottom to said pair of separate components.

3. A box comprising a component forming the box bottom and at least one vertical wall, separate components forming other vertical walls, and a wrapper comprising the sole means uniting said components having panels joining said separate components to the box bottom of said first component and corner-lap sections joining said separate components to said vertical wall of said first component.

4. A box comprising a component forming the box bottom and a pair of vertical walls, separate components forming another pair of vertical walls, and a wrapper comprising the sole means for uniting said components in box-forming position having panels joining said pair of separate components to the box bottom of said first component, and corner-lap sections joining said pair of separate components to said pair of vertical walls of said first component.

5. A box having a bottom and a plurality of vertical walls comprising a plurality of separate components of box material, a wrapper comprising the sole means for uniting said components in box-forming position, and tab structure interposed between the wrapper and said box for reinforcing the union between said separate components.

6. A box having a bottom and a plurality of vertical walls comprising a plurality of separate components of box material, a wrapper comprising the sole means for uniting said components in box-forming position, and a plurality of tabs interposed between the wrapper and said box overlying vertical edges of the box formed by separate components held in position by said wrapper.

7. A box comprising a component forming the box bottom and at least one vertical wall, separate components forming other vertical walls, a wrapper comprising the sole means for uniting said components in box-forming position having panels joining said box bottom to said separate components, and tab structure interposed between the box and said wrapper overlying and reinforcing the bottom edges of the box formed by said first component and said separate components.

8. A box comprising a component forming the box bottom and a pair of vertical walls, separate components forming another pair of vertical walls, a wrapper comprising the sole means for uniting said components in box-forming position having panels joining said box bottom to said pair of separate components, and tab structure interposed between the box and wrapper reinforcing the bottom edges of the box formed by the union of said pair of separate components by said wrapper panels.

9. A box comprising a component forming the box bottom and a pair of vertical walls, separate components forming another pair of vertical walls, a wrapper comprising the sole means for uniting said components in box-forming position having panels joining said pair of separate components to the box bottom of said first component and corner-lap sections joining said pair of separate components to said pair of vertical walls of said first component, and tab structure interposed between the box and wrapper overlying bottom and vertical corners of the box formed by the union of said components by said wrapper panels and sections.

10. A box having a bottom and a plurality of vertical walls comprising a plurality of separate components of box material, a wrapper comprising the sole means for holding said separate components in box-forming position, and tab structure interposed between the wrapper and box extending over the top edges thereof and downwardly into engagement with the interior of the box at inside corners formed by separate components held in abutting relation by the wrapper.

11. A box comprising a component forming the box bottom and a pair of vertical walls separate components forming another pair of vertical walls, a wrapper comprising the sole means for uniting said components in box-forming position having panels joining said separate components to the box bottom of said first component, and corner-lap sections joining said pair of separate components to said pair of vertical walls of said first component, and continuous tab structure interposed between the box and wrapper at each end thereof to reinforce the bottom and vertical corners.

12. A box comprising a component forming the box bottom and a pair of vertical walls, separate components forming another pair of vertical walls, a wrapper comprising the sole means for uniting said components in box-forming position having panels joining said separate components to the box bottom of said first component, and corner-lap sections joining said pair of separate components to said pair of vertical walls of said first component, and a plurality of tabs interposed between the box and wrapper each reinforcing the vertical corner of the box formed by the adjacent edges of one of said separate components and a vertical wall of said first component.

13. A box comprising a component forming the box bottom and a pair of vertical walls, separate components forming another pair of vertical walls, a wrapper comprising the sole means for uniting said components in box-forming position having panels joining said separate components to the box bottom of said first component, and corner-lap sections joining said pair of separate components to said pair of vertical walls of said first component, a plurality of tabs interposed between the box and wrapper each reinforcing the vertical corner of the box formed by the adjacent edges of one of said separate components and a vertical wall of said first component, and tabs each reinforcing a bottom edge of the box formed by the adjacent edges of one of said separate components and the box bottom of said first component.

14. A box having a bottom and a plurality of side walls comprising a plurality of separate components of box material, a corner-notched wrapper comprising the sole means for uniting said components in box-forming positon, and tab structure interposed between the wrapper and box reinforcing the union between components held in abutting relation by said wrapper and bridging the corner-notches thereof to reinforce the bottom trihedral corners formed by said components.

15. A box comprising a component forming the box bottom and a pair of vertical walls, separate components forming another pair of vertical walls, a corner-notched wrapper comprising the sole means for uniting said components in box-forming position having panels joining said separate components to the box bottom of said first component, and corner-lap sections joining said pair of separate components to said pair of vertical walls of said first component, and continuous tab structure interposed between the box and wrapper at each end thereof to reinforce the bottom and vertical corners, and bridging the corner-notches of said wrapper to reinforce the bottom trihedral corners of said box formed by the abutting relation of said separate components and said first component as effected by said wrapper.

16. A box comprising a component forming the box bottom, separate components forming vertical walls, and sheet material adhesively applied to said components and comprising the sole means holding said components permanently in box-forming position.

17. A box comprising a component forming the box-bottom, separate components forming vertical walls, and sheet material overlying corners of the box formed by abutting edges of said components and comprising the sole means holding said components permanently in box forming position.

18. A box comprising a component forming the box bottom and side walls, separate components forming end walls, and sheet material comprising the sole means for holding said components permanently in box-forming position adhesively engaging neighboring side and end walls and embracing the corners formed by their abutting edges, and adhesively engaging said end walls and said bottom and embracing the corners formed by their abutting edges.

JOHN S. STOKES.